United States Patent

[11] 3,623,044

| [72] | Inventor | Ronald M. Wagner<br>Greendale, Wis. |
|---|---|---|
| [21] | Appl. No. | 845,139 |
| [22] | Filed | July 28, 1969 |
| [45] | Patented | Nov. 23, 1971 |
| [73] | Assignee | General Motors Corporation<br>Detroit, Mich. |

[54] DEMODULATING METHOD AND APPARATUS
5 Claims, 3 Drawing Figs.

[52] U.S. Cl. .................................................. 340/187,
340/199, 324/83 A, 328/133
[51] Int. Cl. ................................................. G08c 19/02
[50] Field of Search ........................................ 340/199,
195, 187; 324/83 A; 307/232; 328/133

[56] References Cited
UNITED STATES PATENTS
| 2,722,605 | 11/1955 | Mills et al. ................... | 324/83 A |
|---|---|---|---|
| 2,968,031 | 1/1961 | Higa ............................ | 324/83 A |
| 3,046,535 | 7/1962 | Philbin et al. ................ | 340/199 |
| 3,121,843 | 2/1964 | Ule .............................. | 328/133 |
| 3,284,786 | 11/1966 | Harris .......................... | 340/195 |
| 3,519,841 | 7/1970 | Leinfelder .................... | 324/83 A |

Primary Examiner—John W. Caldwell
Assistant Examiner—Robert J. Mooney
Attorneys—E. W. Christen, C. R. Meland and Tim G. Jagodzinski ABSTRACT: A method and apparatus for provided for producing a DC output signal having a polarity which is indicative of the phase relationship between an AC input signal and an AC reference signal and having an amplitude which is indicative of the amplitude of the AC input signal. The method and apparatus are applied to determine the direction and the magnitude of the displacement of a movable member form a null position.

INVENTOR.
Ronald M. Wagner
BY
C.L. Meland
ATTORNEY

DEMODULATING METHOD AND APPARATUS

The invention herein described was made in the course of work under a contract or subcontract thereunder with the Department of Defense.

This invention relates to a method and an apparatus for demodulating an amplitude modulated signal. More specifically, the invention relates to a system and a technique for measuring the displacement of a movable member from a null position.

According to one aspect of the invention, a method and an apparatus are provided for determining the phase relationship between an AC input signal and an AC reference signal and for determining the amplitude of the AC input signal. In general, this is accomplished as follows. A chopper rectifies the AC input signal to obtain a half-wave rectified DC signal. The half-wave rectified DC signal is of one polarity when the AC input signal is in phase with the AC reference signal and of the opposite polarity when the AC input signal is out of phase with the AC reference signal. An attenuator decreases the amplitude of the AC input signal to obtain a reduced amplitude AC signal. A differencer subtracts the reduced amplitude AC signal from the half-wave rectified DC signal to obtain a full-wave rectified DC signal having the same polarity as the half-wave rectified signal. A filter averages the amplitude of the full-wave rectified DC signal to obtain a DC output signal having a polarity which is indicative of the phase relationship between the AC input signal and the AC reference signal and having an amplitude which is indicative of the amplitude of the AC input signal.

In another aspect of the invention, a system and a technique are provided for determining the direction and the magnitude of the displacement of a movable member from a null position. Generally, this is accomplished as follows. A position sensor is mechanically connected to the movable member for producing an AC input signal. The AC input signal is of one phase when the movable member is displaced in one direction from the null position and is of the opposite phase when the movable member is displaced in the opposite direction from the null position. The amplitude of the AC input signal is a function of the magnitude of the displacement of the movable member from the null position. A signal generator produces an AC reference signal having a phase which is the same as one phase of the AC input signal and opposite to the other phase of the AC input signal. The AC input signal and the AC reference signal are processed as previously described to obtain a DC output signal. The DC output signal has a polarity which indicates the direction of the displacement of the movable member from the null position and has an amplitude which indicates the magnitude of the displacement of the movable member from the null position.

Other aspects and advantages will become more apparent by reference to the following detailed description of a preferred embodiment when considered in conjunction with the accompanying drawing, in which.

Figure 1:
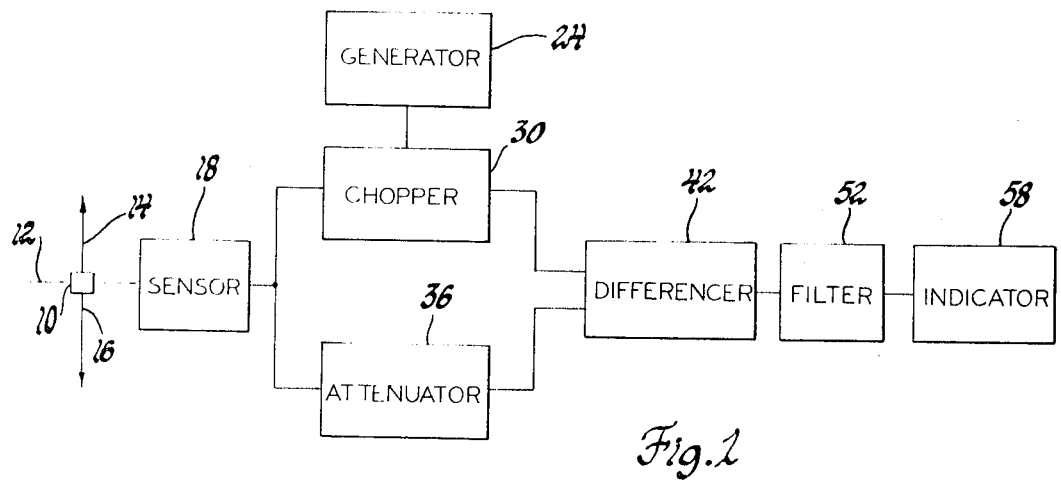
FIG. 1 is a block diagram of a displacement measuring system incorporating the principles of the invention.
Figure 2A:
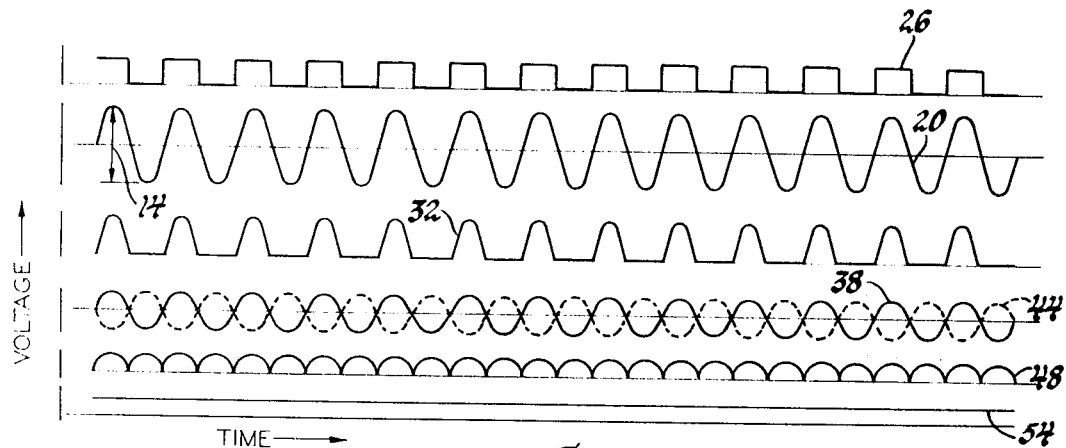
FIG. 2a and 2b are graphs of several waveforms useful in describing the block diagram of FIG. 1.
Figure 2B:
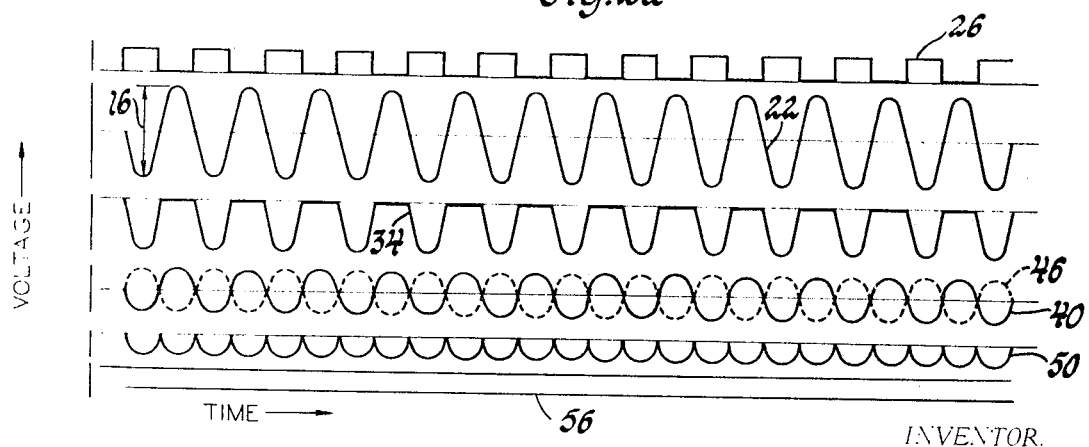

Referring to the drawing, FIG. 1 discloses a displacement measuring system for indicating the direction and the magnitude of the displacement of a movable member 10 from a null position 12. In describing the illustrated system, it will be assumed that the movable member 10 is constrained to bidirectional translation as indicated by the arrows 14 and 16. The operation of the illustrated system will be considered when the displacement of the movable member 10 is as indicated by the arrow 14 and when it is as indicated by the arrow 16. The sense and the length of the arrows 14 and 16 represents the direction and the magnitude of the displacement of the movable member 10 from the null position 12. FIG. 2 of the drawing discloses a set of waveforms which are produced within the illustrated system. The waveforms in FIG. 2a are developed when the movable member 10 is displaced as indicated by the arrow 14, while the waveforms in FIG. 2b are developed when the movable member 10 is displaced as indicated by the arrow 16.

A position sensor 18 is mechanically connected with the movable member 10. The position sensor 18 produces an AC input signal for the illustrated displacement measuring system. The AC input signal is of one phase when the movable member 10 is displaced in one direction from the null position 12 and is of the opposite phase when the movable member 10 is displaced in the opposite direction from the null position 12. The amplitude of the AC input signal is directly proportional to the magnitude of the displacement of the movable member 10 from the null position 12. Thus, when the movable member 10 is displaced as indicated by the arrow 14, the position sensor 18 produces a sine wave input signal 20. Conversely, when the displacement of the movable member 10 is as indicated by the arrow 16, the position sensor 18 produces a sine wave input signal 22. The phase of the input signals 20 and 22 corresponds to the direction of the displacement of the movable member 10 from the null position 12, while the amplitude of the input signals 20 and 22 corresponds to the magnitude of the displacement of the movable member 10 from the null position 12. The movable member 10 may be any element which exhibits bidirectional movement with respect to a null position. The bidirectional movement need not be translational, it may also be rotational. The position sensor 18 may be any suitable displacement transducer capable of producing the desired AC input signal, such as a synchro or a differential transformer.

A signal generator 24 produces an AC reference signal having the same frequency as the AC input signal and a phase which is the same as one phase of the AC input signal and is opposite to the other phase of the AC input signal. In the illustrated displacement measuring system, the signal generator 24 produces a square wave reference signal 26 having an upper voltage level and a lower voltage level. The reference signal 26 has the same frequency as the input signals 20 and 22 and has a phase which is identical to the phase of the input signal 20 and opposite to the phase of the input signal 22. Although it is illustrated as being a square wave, the AC reference signal may also be a sine wave. The signal generator 24 may be an oscillator or any other suitable signal source. The required phase and frequency relationship between the AC input signal and the AC reference signal may be facilitated by supplying the position sensor 18 and the signal generator 24 from a common AC signal source (not shown).

A gate or chopper 30 is connected to the position sensor 18 for receiving the AC input signal and to the signal generator 24 for receiving the AC reference signal. The chopper 30 rectifies the AC input signal in response to the AC reference signal to obtain a half-wave rectified DC signal. The half-wave rectified DC signal is of one polarity when the AC input signal and the AC reference signal are of the same phase and is of the opposite polarity when the AC input signal and the AC reference signal are of the opposite phase. Thus, when the input signal 20 is produced by the position sensor 18 and the reference signal 26 is produced by the signal generator 24, the half-wave rectified signal 32 is produced by the chopper 30. Similarly, when the input signal 22 is produced by the position sensor 18 and the reference signal 26 is produced by the signal generator 24, the half-wave rectified signal 34 is produced by the chopper 30. The half-wave rectified signal 32 has a positive polarity corresponding to the displacement of the movable member 10 in the direction indicated by the arrow 14, while the half-wave rectified signal 34 has a negative polarity corresponding to the displacement of the movable member 10 in the direction indicated by the arrow 16.

The gate or chopper 30 effectively operates as a switch which is controlled by the voltage level of the AC reference signal. Hence, when the reference signal 26 is at the upper voltage level the chopper 30 effectively passes the input signals 20 and 22, and when the reference signal 26 is at the lower voltage level the chopper 30 effectively blocks the input signals 20 and 22. Thus, the polarity of the half-waves of the AC input signal which are eliminated by the chopper 30 is determined by whether the AC input signal and the AC reference signal are of the same phase or of opposite phase. The gate or chopper 30 may be provided by any suitable voltage controlled circuit capable of performing the desired rectifying function. For example, the chopper 30 may comprise a pair of field-effect transistors having their gate electrodes coupled to the signal generator 24 so as to be controlled by the AC reference signal. When the AC reference signal is a sine wave rather than a square wave, the chopper 30 may be alternately switched on and off in response to the zero crossing of the sine wave.

An attenuator 36 is connected to the position sensor 18 for receiving the AC input signal. The attenuator 36 decreases the amplitude of the AC input signal to obtain a reduced amplitude AC signal. Preferably, the attenuator 36 decreases the amplitude of the AC input signal by one-half. However, as will be more fully explained later, the precise amount of reduction in the amplitude of the AC input signal is not critical. Hence, when the input signal 20 is produced by the position sensor 18, the reduced amplitude signal 38 is produced by the attenuator 36. Similarly, when the input signal 22 is produced by the position sensor 18, the reduced amplitude signal 40 is produced by the attenuator 36. As will be observed, the amplitude of the reduced amplitude signal 38 is approximately one-half the amplitude of the input signal 20, and the amplitude of the reduced amplitude signal 40 is approximately one-half the amplitude of the input signal 22. The attenuator 36 may be any suitable amplitude reducing circuit such as a resistance voltage divider network.

A differencer 42 is connected to the chopper 30 for receiving the half-wave rectified DC signal and to the attenuator 36 for receiving the reduced amplitude AC signal. The differencer 42 subtracts the reduced amplitude AC signal from the half-wave rectified DC signal to obtain a full-wave rectified DC signal having the same polarity as the half-wave rectified DC signal. The required subtraction is accomplished by adding the half-wave rectified DC signal and the reciprocal of the reduced amplitude AC signal. The reciprocal of the reduced amplitude AC signal is obtained by inverting its phase. Preferably, the differencer 42 is a differential amplifier wherein the phase inversion of the reduced amplitude AC signal is automatically accomplished within the differential amplifier. However, where the differencer 42 is other than a differential amplifier, the phase inversion of the reduced amplitude signal may be performed by any suitable phase-inverting device such as an ordinary junction transistor.

The reciprocal of the reduced amplitude signal 38 is the signal 44, while the reciprocal of the reduced amplitude signal 40 is the signal 46. Thus, when the half-wave rectified signal 32 is produced by the chopper 30 and the reduced amplitude signal 38 is produced by the attenuator 36, the full-wave rectified signal 48 is produced by the differencer 42. Likewise, when the half-wave rectifier signal 34 is produced by the chopper 30 and the reduced amplitude signal 40 is produced by the attenuator 36, the full-wave rectified signal 50 is produced by the differencer 42. The full-wave rectified signal 48 has the same polarity as the half-wave rectified signal 32, while the full-wave rectified signal 50 has the same polarity as the half-wave rectified signal 34. Further, where the amplitude of the reduced amplitude AC signal is one-half the amplitude of the AC input signal, the full-wave rectified DC signal is also one-half the amplitude of the AC input signal.

A filter 52 is connected to the differencer 42 for receiving the full-wave rectified DC signal. The filter 52 averages the amplitude of the full-wave rectified DC signal to obtain a DC output level or signal. Hence, when the full-wave rectified signal 48 is produced by the differencer 42, the output signal 54 is produced by the filter 52. Similarly, when the full-wave rectified signal 50 is produced by the differencer 42, the output signal 56 is produced by the filter 52. It will be appreciated that where the amplitude of the reduced amplitude AC signal is other than one-half the amplitude of the AC input signal, the amplitude of the full-wave rectified DC signal will be irregular. However, this is tolerable as long as the filter 52 is capable of transforming the full-wave rectified DC signal into a smooth DC output level. The filter 52 may be provided by any suitable filter exhibiting the desired low-pass characteristics.

It will now be apparent that the polarity of the DC output signal indicates the direction of the displacement of the movable member 10 from the null position 12, and the amplitude of the DC output signal indicates the relative magnitude of the displacement of the movable member 10 from the null position 12. Hence, when the displacement of the movable member 10 is in the direction and of the magnitude indicated by the arrow 14, the output signal 54 is produced by the illustrated displacement measuring system. Similarly, when the displacement of the movable member 10 is in the direction and of the magnitude indicated by the arrow 16, the output signal 56 is produced by the illustrated displacement measuring system. A voltage indicator 58, such as a voltmeter or an oscilloscope, may be connected to the filter for receiving and displaying the polarity and the magnitude of the DC output signal.

It will now be readily appreciated that in the illustrated displacement measuring system the position sensor 18 is in effect a modulator. Thus, the AC input signal produced by the position sensor 18 is a modulated signal having a phase which indicates the direction of the displacement of the movable member 10 and having a magnitude which indicates the magnitude of the displacement of the movable member 10. As an example, the sine wave input signals 20 and 22 may represent the sideband signals of a modulated signal from which the carrier signal has been suppressed. The rest of the illustrated displacement measuring system is a demodulator for recovering the displacement information contained within the modulated AC input signal. However, it is to be noted that the inventive method and apparatus are not limited in application to a displacement measuring system. The subject invention may be employed wherever it is desired to determine the phase relationship between an AC input signal and an AC reference signal, and to determine the amplitude of the AC input signal. Therefore, the subject invention has broad utility throughout the field of electrical instrumentation.

What is claimed is:

1. A method for determining the phase relationship between an AC input signal and an AC reference signal which are constrained to be either of the same phase of the AC input signal, the method comprising the steps of: converting the AC input signal into a half-wave rectified DC signal having one polarity when the AC input signal is in phase with the AC reference signal and having the opposite polarity when the AC input signal is out of phase with the AC reference signal; decreasing the amplitude of the AC input signal so as to obtain a reduced amplitude AC signal; subtracting the reduced amplitude AC signal from the half-wave rectified DC signal to obtain a full-wave rectified DC signal having the same polarity as the half-wave rectified DC signal; and averaging the amplitude of the full-wave rectified DC signal to obtain a DC output signal having a polarity which is indicative of the phase relationship between the AC input signal and the AC reference signal and having an amplitude which is indicative of the amplitude of the AC input signal.

2. A method for determining the direction and the magnitude of the displacement of a movable member from a null position, the method comprising the steps of: producing an AC input signal having one phase when the movable member is displaced in one direction from the null position and having the opposite phase when the movable member is displaced in the opposite direction from the null position, the AC input signal further having an amplitude which is a function of the magnitude of the displacement of the movable member from the null position; producing an AC reference signal having a frequency which is identical to the frequency of the AC input signal; and having a phase which is the same as one phase of the AC input signal and opposite to the other phase of the AC input signal; rectifying the AC input signal in response to the AC refererne signal to obtain a half-wave rectified DC signal having one polarity when the AC input signal and the AC reference signal are are of the same phase and having opposite polarity when the AC input signal and the AC reference signal are of the opposite phase; decreasing the amplitude of the AC input signal to obtain a reduced amplitude AC signal; adding the half-wave rectified DC signal and the reciprocal of the reduced amplitude AC signal to obtain a full-wave rectified DC signal having the same polarity as the half-wave rectified DC signal; and averaging the amplitude of the full-wave rectified DC signal to obtain a DC output signal having a polarity which indicates the direction of the displacement of the movable member from the null position and having an amplitude which indicates the magnitude of the displacement of the movable member from the null position.

3. An apparatus for indicating the phase relationship between an AC input signal and an AC reference signal which are constrained to be either of the same phase or of the opposite phase and for indicating the amplitude of the AC input signal, the apparatus comprising: switching means connected to receive the AC input signal and the AC reference signal for rectifying the AC input signal in response to the AC reference signal to obtain a half-wave rectified DC signal having one polarity when the AC input signal and the AC reference signal are of the same phase and having the opposite polarity when the AC input signal and the AC reference signal are of the opposite phase; attenuating means connected to receive the AC input signal for decreasing the amplitude of the AC input signal to obtain a reduced amplitude AC signal; differencing means connected to the switching means and to the attenuating means for subtracting the reduced amplitude AC signal from the half-wave rectified DC signal to obtain a DC output signal having a polarity which is indicative of the phase relationship between the AC input signal and the AC reference signal and having an amplitude which is indicative of the amplitude of the AC input signal.

4. An apparatus for determining the direction and the magnitude of the displacement of a movable member from a null position, the apparatus comprising: position sensor means mechanically connected with the movable member for providing an AC input signal having one phase when the movable member is displaced in one direction from the null position and having the opposite phase when the movable member is displaced in the opposite direction from the null position, the AC input signal further having an amplitude which is a function of the magnitude of the displacement of the movable member from the null position; signal generator means for producing an AC reference signal having a frequency which is identical to the frequency of the AC input signal and having a phase which is the same as one phase of the AC input signal and opposite to the other phase of the AC input signal; chopper means connected to the position sensor means and to the signal generator means for rectifying the AC input signal in response to the AC reference signal to obtain a half-wave rectified DC signal having one polarity when the AC input signal and the AC reference signal are of the same phase and having the opposite polarity when the AC input signal and the AC reference signal are of opposite phase; attenuator means connected to the position sensor means for decreasing the amplitude of the AC input signal to obtain a reduced amplitude AC signal; differencer means connected to the chopper means and to the attenuator means for inverting the reduced amplitude AC signal and adding it with the half-wave rectified DC signal to obtain a full-wave rectified DC signal having the same polarity as the half-wave rectified DC signal; and filter means connected to the differencer means for averaging the amplitude of the full-wave rectified DC signal to obtain a DC output signal having a polarity which indicates the direction of the displacement of the movable member from the null position and having an amplitude which indicates the magnitude of the displacement of the movable member from the null position.

5. An apparatus for determining the direction and the magnitude of the bidirectional displacement of a movable member from a null position, the apparatus comprising: position sensing means mechanically connected with the movable member for producing a sine wave input signal having one phase when the movable member is displaced in one direction from the null position and having the opposite phase when the movable member is displaced in the opposite direction from the null position, the sine wave input signal further having an amplitude which is proportional to the magnitude of the displacement of the movable member from the null position; signal-generating means for producing a square wave reference signal having different first and second levels alternating at a frequency which is the same as the frequency of the input signal and having a phase which is the same as one phase of the input signal and opposite to the other phase of the input signal; chopping means connected to the position-sensing means and to the signal-generating means for effectively passing the input signal when the reference signal is at the first level and for effectively blocking the input signal when the reference signal is at the second level, the chopping means thereby providing a half-wave rectified signal having one polarity when the input signal and the reference signal are of the same phase and having an opposite polarity when the input signal and the reference signal are of the opposite phase; attenuating means connected to the position sensing means for decreasing the amplitude of the input signal by one-half to obtain a reduced amplitude signal; differencing means connected to the chopping means and the attenuating means for subtracting the reduced amplitude signal from the half-wave rectified signal to obtain a full-wave rectified signal having the same polarity as the half-wave rectified signal; and filtering means connected to the differencing means for averaging the amplitude of the full-wave rectified signal to obtain an output signal level having a polarity which indicates the direction of the displacement of the movable member from the null position and having an amplitude which indicates the magnitude of the displacement of the movable member from the null position.

* * * * *

UNITED STATES PATENT OFFICE
CERTIFICATE OF CORRECTION

Patent No. 3,623,044         Dated November 23, 1971

Inventor(s)     Ronald M. Wagner

It is certified that error appears in the above-identified patent and that said Letters Patent are hereby corrected as shown below:

In the Abstract, line 1, the first "for" should read -- are --; last line, "form" should read -- from --. Column 4, claim 1, line 46, after "phase" insert -- or of the opposite phase and for determining the amplitude --. Column 5, claim 2, line 2, "referernc" should read -- reference --; claim 2, line 4, after "signal", cancel "are", first occurrence.

Signed and sealed this 13th day of June 1972.

(SEAL)
Attest:

EDWARD M. FLETCHER, JR.          ROBERT GOTTSCHALK
Attesting Officer                Commissioner of Patents